(12) United States Patent
Su et al.

(10) Patent No.: US 10,913,676 B2
(45) Date of Patent: Feb. 9, 2021

(54) THERMOFORMING METHOD, THERMOFORMING MOLD AND THERMOFORMING DEVICE FOR GLASS PRODUCT

(71) Applicant: AAC Technologies Pte. Ltd., Singapore (SG)

(72) Inventors: Wei Su, Shenzhen (CN); Bo Xu, Shenzhen (CN); Xuefeng Liu, Shenzhen (CN); Zaizhang Ye, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 122 days.

(21) Appl. No.: 16/102,909

(22) Filed: Aug. 14, 2018

(65) Prior Publication Data
US 2019/0152830 A1    May 23, 2019

(30) Foreign Application Priority Data

Nov. 17, 2017 (CN) .......................... 2017 1 1143504

(51) Int. Cl.
  *C03B 23/03* (2006.01)
  *C03B 27/044* (2006.01)
  (Continued)

(52) U.S. Cl.
  CPC ...... *C03B 23/0307* (2013.01); *C03B 23/0302* (2013.01); *C03B 25/08* (2013.01);
  (Continued)

(58) Field of Classification Search
  CPC . C03B 23/03; C03B 23/0302; C03B 23/0305; C03B 23/0307; B32B 17/10889
  See application file for complete search history.

(56) References Cited

U.S. PATENT DOCUMENTS

2019/0135677 A1*  5/2019  Fukushi .............. C03B 23/0302

FOREIGN PATENT DOCUMENTS

| CN | 206127111 B1 | 4/2017 |
| CN | 206457403 B1 | 9/2017 |

OTHER PUBLICATIONS

CN206457403U Google Machine Translation Performed May 20, 2020. (Year: 2020).*

(Continued)

*Primary Examiner* — Lisa L Herring
(74) *Attorney, Agent, or Firm* — IPro, PLLC; Na Xu

(57) ABSTRACT

The present disclosure relates to a thermoforming method, a thermoforming mold, and a thermoforming device. The method comprises: providing a glass sheet to be processed at a softening point temperature and above; providing a thermoforming mold which comprises a male mold, a female mold arranged above the male mold and matched therewith, and a limiting block for limiting the female mold from deviate from the male mold, wherein the female mold comprises a central body module and a female mold frame surrounding the central body module and matched therewith; a first pressurizing process, wherein the central body module and the male mold are matched to press a central plane portion of the glass sheet; and a second pressurizing process, wherein the female mold frame and the male mold are matched to press a peripheral portion of the glass sheet so that the peripheral portion is bent and molded relative to the central plane portion; wherein the central plane portion is always pressed by the central body module in the second pressurizing process. The method improves the quality of a molded glass product and enhances the manufacturing yield of the glass product.

6 Claims, 3 Drawing Sheets

(51) Int. Cl.
  *C03B 35/20* (2006.01)
  *C03B 25/08* (2006.01)
  *C03B 35/18* (2006.01)
  *B32B 17/10* (2006.01)

(52) U.S. Cl.
  CPC ........ *C03B 27/0442* (2013.01); *C03B 35/202* (2013.01); *B32B 17/10889* (2013.01); *C03B 35/184* (2013.01); *C03B 35/207* (2013.01)

(56) References Cited

OTHER PUBLICATIONS

1st Office Action dated Nov. 14, 2019 by SIPO in related Chinese Patent Application No. 201711143504.9 (9 Pages).

* cited by examiner

US 10,913,676 B2

THERMOFORMING METHOD, THERMOFORMING MOLD AND THERMOFORMING DEVICE FOR GLASS PRODUCT

CROSS-REFERENCE TO RELATED APPLICATIONS

This application claims the priority benefit of Chinese Patent Application Ser. No. 201711143504.9 filed on Nov. 17, 2017, the entire content of which is incorporated herein by reference.

FIELD OF THE PRESENT DISCLOSURE

The present disclosure relates to the technical field of glass thermoforming, and more particularly, to a thermoforming method, a thermoforming mold and a thermoforming device for a glass product.

DESCRIPTION OF RELATED ART

A thermoforming device can thermoform a glass product. When the glass product is thermoformed, a glass sheet is put into a molding mold firstly, and the glass sheet is moved to a molding chamber along with the molding mold. In the thermoforming process, the glass sheet is gradually heated through a plurality of heating stations, and a temperature of the glass sheet is gradually increased from a room temperature $T_0$ to a bending temperature $T_3$. In the warm-up preheating stage, the molding mold does not apply stress to the glass.

When the glass sheet is completely preheated and reaches the bending temperature $T_3$, the glass sheet is transported to each pressurizing station. The pressurizing station applies a stress to an upper mold through a cylinder or a motor, and the upper mold is held down by the stress so that the upper mold is moved downwards, and the upper mold and the lower mold of the molding mold are clamped, and the glass sheet is molded. A plurality of pressurizing stations can also be provided. The glass sheet sequentially passes through the pressurizing stations and is gradually pressed and molded.

After being hot-bent and molded, the glass sheet also needs to be cooled. At this time, the hot-bent glass is transported to the cooling stations. After passing through two (or more) cooling stations, the temperature of the glass sheet decreases and approaches to the room temperature $T_0$, the molding mold is moved to the outside of the cooling station, and the mold is opened to take the molded glass product out from a hot-bending machine, and the hot-bending process of the glass sheet is ended.

In the above-mentioned hot-bending and molding process, the flatness of the molded glass product is not ideal, and the size of the glass product is shifted, resulting in that the quality of the glass product cannot be guaranteed, and the manufacturing yield of the glass product is reduced.

SUMMARY

The present disclosure provides a thermoforming method, a thermoforming mold and a thermoforming device for a glass product, which can improve the processing quality of the glass product and improve the manufacturing yield of the glass product.

The present disclosure provides a thermoforming method for a glass product, comprising:

providing a glass sheet to be processed at a softening point temperature and above;

providing a thermoforming mold which comprises a male mold, a female mold arranged above the male mold and matched therewith, and a limiting block for limiting the female mold to deviate from the male mold, wherein the female mold comprises a central body module and a female mold frame surrounding the central body module and matched therewith;

a first pressurizing process, wherein the central body module and the male mold are matched to press a central plane portion of the glass sheet; and a second pressurizing process, wherein the female mold frame and the male mold are matched to press a peripheral portion of the glass sheet so that the peripheral portion is bent and molded relative to the central plane portion;

wherein, the central plane portion is always pressed by the central body module in the second pressurizing process.

Alternatively, the method further comprising:

a heating process which comprises a preheating stage and a heating stage, wherein the glass sheet is heated to a preheating temperature in the preheating stage, and the glass sheet is heated to the softening point temperature and above in the heating stage.

Alternatively, the method further comprising:

a cooling process for cooling a molded glass product, the cooling process comprising a first cooling stage and a second cooling stage, wherein the molded glass product is cooled from the softening point temperature to an intermediate temperature in the first cooling stage, and the molded glass product is cooled from the intermediate temperature to a room temperature in the second cooling stage, and a cooling rate of the first cooling stage is less than a cooling rate of the second cooling stage.

The present disclosure further provides a thermoforming mold for a glass product, wherein the thermoforming mold adopts the thermoforming method according to any one of methods described above, comprising:

a male mold;

a female mold matched with the male mold; and a limiting block limitedly matched with the female mold to limit the female mold from deviation, wherein, the female mold comprises a central body module and a female mold frame surrounding the central body module, and the central body module and the female mold frame respectively have relative movement strokes for being clamped with and split from the male mold, and the central body module and the male mold are clamped to press the central plane portion of the glass sheet, and the female mold frame and the male mold are clamped to press the peripheral portion of the glass sheet.

Alternatively, the central body module is a T-shaped structure comprising a horizontal portion and a vertical portion connected to each other, and the female mold frame is configured with an accommodating cavity for accommodating the central body module, and the accommodating cavity comprises a large end and a small end arranged in order from top to bottom and communicated with each other, the horizontal portion is limitedly matched with an inside wall of the large end, and the vertical portion is limitedly matched with an inside wall of the small end.

Alternatively, the horizontal portion does not exceed an upper end plane of the large end in the relative movement stroke that the central body module is split from the male mold.

Alternatively, the limiting block is configured with a cavity penetrating through a mold clamping direction, and the small end is limitedly matched with an inside wall of the cavity in the relative movement stroke that the female mold frame is clamped with the male mold.

Alternatively, the central body module comprises a first pressing plane, and the entire upper surface of the central plane portion is covered by the first pressing plane.

The present disclosure further provides a thermoforming device for a glass product, comprising:
a heating station;
a pressurizing station;
a cooling station; and
the thermoforming mold according to any one of device described above,
wherein, the thermoforming mold with the glass sheet pass through the heating station, the pressurizing station and the cooling station,
the pressurizing station comprises a first driving portion and a second driving portion, the first driving portion is driving connected with the central body module, and the second driving portion is driving connected with the female mold frame, and
under the action of a driving force of the first driving portion, the central body module generates a first stroke matched with the male mold, under the action of a driving force of the second driving portion, the female mold frame generates a second stroke matched with the male mold, and a terminal position of the second stroke is lower than a terminal position of the first stroke.

The technical solution provided by the present disclosure can achieve the following beneficial effects:
the present disclosure provides a thermoforming method for a glass product, wherein the thermoforming method adopts a step-by-step pressurized thermoforming method, i.e., the central plane portion of the glass sheet is firstly molded, and the central body module is continuously maintained to be matched with the male mold after molding; at this moment, the female mold frame and the male mold are matched to press the peripheral portion of the glass sheet. In the thermoforming method, since the central plane portion is always pressed by the central body module, even if the peripheral portion of the glass sheet is molded again in the subsequent pressurizing process, warping and size deviation of the central plane portion will not be caused, thereby improving the quality of the molded glass product and enhancing the manufacturing yield of the glass product.

It should be understood that the foregoing general description and the following detailed description are exemplary only, and cannot limit the disclosure.

REFERENCE NUMERALS

2—thermoforming mold;
202—female mold;
202*a*—central body module;
202*aa*—horizontal portion;
202*ab*—vertical portion;
202*ac*—first pressing plane;
202*b*—female mold frame;
202*bb*—accommodating cavity;
204—male mold;
206—limiting block;
4—thermoforming device;
402—heating process;
404—pressurizing process;
406—cooling station; and
6—glass sheet.

The accompanying drawings herein are incorporated in and constitute a part of this description, illustrate the embodiments in conformity with the disclosure, and serve to explain the principles of the disclosure together with the description.

DETAILED DESCRIPTION OF THE EXEMPLARY EMBODIMENTS

The disclosure will be further described in detail below through specific embodiments and with reference to the accompanying drawings.

Figure 1:
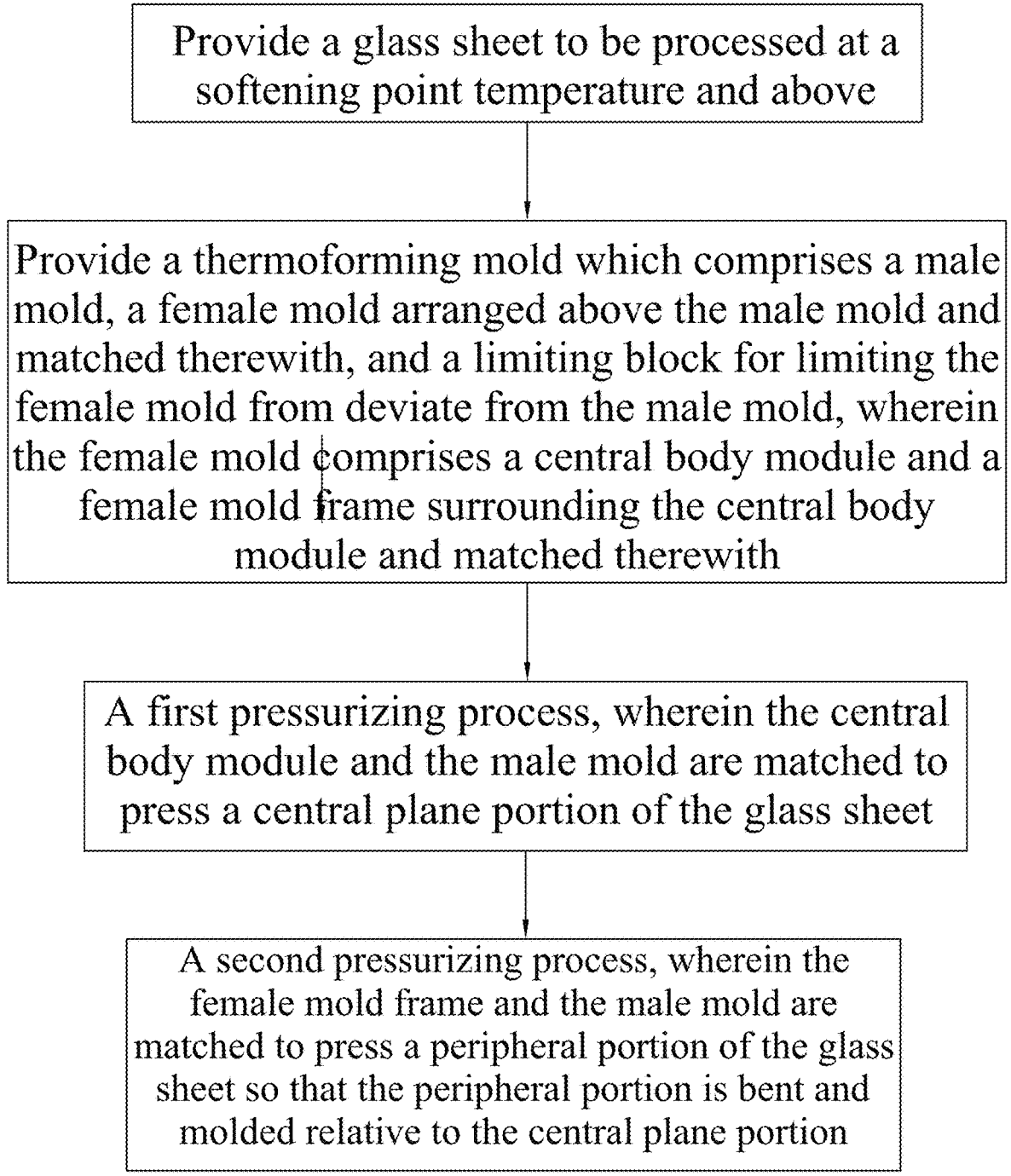
FIG. 1 is a flow chart of a thermoforming method provided by an embodiment of the present disclosure.
Figure 2:
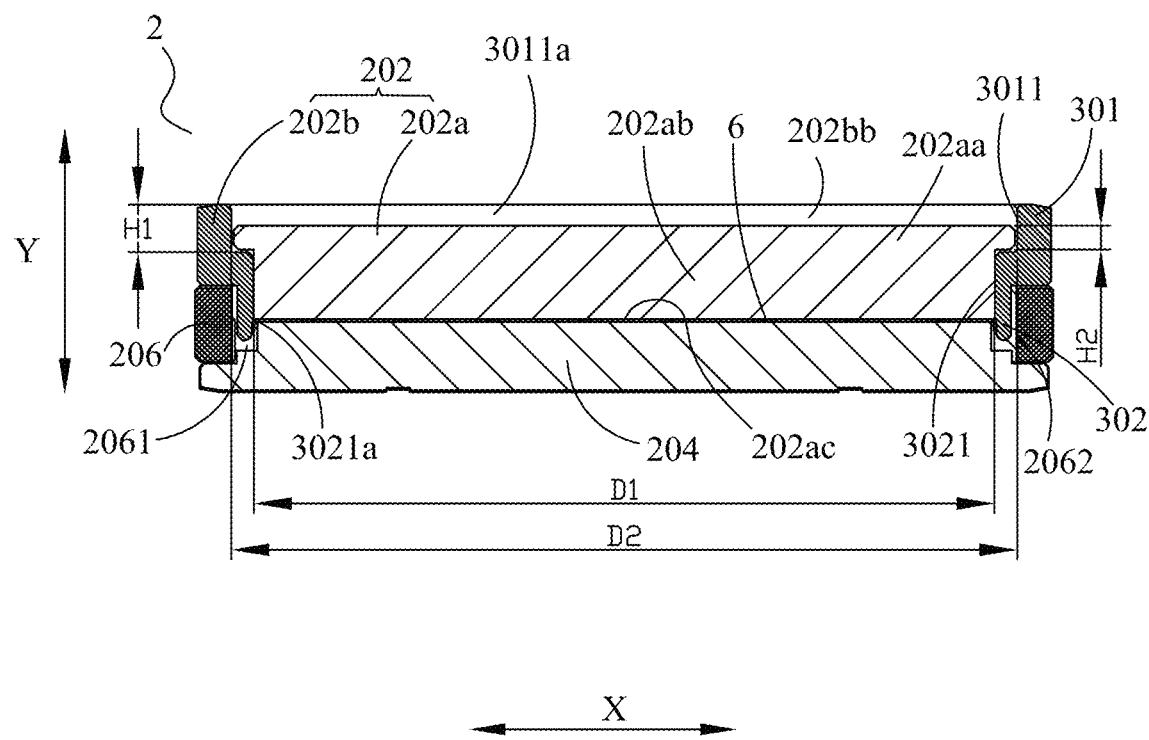
FIG. 2 is a schematic diagram of a thermoforming mold provided by an embodiment of the present disclosure.

As shown in FIGS. 1 and 2, the present disclosure provides a thermoforming method for a glass product. The thermoforming process of the glass product needs to be equipped with a thermoforming mold 2 which comprises a male mold 204 and a female mold 202 matched therewith, wherein the female mold 202 comprises a central body module 202*a* and a female mold frame 202*b* surrounding the central body module 202*a* and matched therewith, and the central body module 202*a* and the female mold frame 202*b* together with the male mold 204 form a cavity of the glass product.

The thermoforming method comprises a heating process, a pressurizing process, and a cooling process. In the thermoforming process of the glass product, the thermoforming mold 2 carries a glass sheet 6 to sequentially move in the heating process, the pressurizing process, and the cooling process.

Specifically, in the heating process, the glass sheet 6 placed on the male mold 204 of the thermoforming mold 2 can be heated so that the temperature of the glass sheet 6 gradually rises from an initial temperature (room temperature) to a softening point temperature, thereby providing the glass sheet 6 to be processed at the softening point temperature and above.

When the glass sheet 6 reaches the softening point temperature, it is transferred to the pressurizing process. In the pressurizing process, the female mold 202 located above the male mold 204 is matched with the male mold 204 to apply a pressure to the glass sheet 6, so as to mold the glass sheet 6. The molded glass sheet 6 becomes a glass product that can be used as a product component, such as a mobile phone glass screen.

The pressurizing process comprises a first pressurizing process and a second pressurizing process. In the first pressurizing process, the central body module 202*a* and the male mold 204 are firstly matched to press the central plane portion of the glass sheet 6. At this moment, the central plane portion of the glass sheet 6 is molded, then the matched state of the central body module 202*a* and the male mold 204 is continuously kept, and the second pressurizing process is entered. In the second pressurizing process, the female mold frame 202*b* and the male mold 204 are matched to press a peripheral portion of the glass sheet 6, so that the peripheral portion is bent and molded relative to the central plane portion.

The molded glass sheet 6 is entered into the next process, i.e., the cooling process. In the cooling process, the temperature of the glass product is gradually reduced to a room temperature.

As described above, during the pressurizing process of the glass product, a step-by-step pressurized thermoforming method is adopted, i.e., the central plane portion of the glass sheet 6 is firstly molded, and the central body module 202a is continuously maintained to be matched with the male mold 204 after molding; at this moment, the female mold frame 202b and the male mold 204 are matched to press the peripheral portion of the glass sheet 6. In the thermoforming method, since the central plane portion is always pressed by the central body module 202a, therefore, even if the peripheral portion of the glass sheet is molded again in the subsequent pressurizing process, warping and size deviation of the central plane portion will not be caused, thereby improving the quality of the molded glass product and enhancing the manufacturing yield of the glass product.

The glass sheet 6 is heated by the heating process to reach the softening point temperature. Alternatively, the heating process may comprise a preheating stage and a heating stage. In the preheating stage, the glass sheet 6 reaches the preheating temperature from the room temperature. In the heating stage, the glass sheet 6 reaches the softening point temperature from the preheating temperature. The heating method can ensure that the glass sheet 6 is sufficiently heated and the temperature of various portions of the glass sheet 6 is relatively balanced to reduce the temperature difference.

On the other hand, the cooling process may also comprise a first cooling stage and a second cooling stage. In the first cooling stage, the glass product is cooled from the softening point temperature to an intermediate temperature, and in the second cooling stage, the glass product is cooled from the intermediate temperature to the room temperature. In order to reduce the defects of the glass product during cooling, an alternative solution is to slowly cool the glass product at the beginning stage of the cooling process to reduce the deformation of the glass product and avoid large size deviation of the molded glass product. After the deformation of the glass product is stabilized, the second cooling stage can be entered. At this time, the glass product can be cooled at a cooling rate more than the cooling rate of the first cooling stage. The "slow cooling" mentioned herein refers to cooling at a rate less than a certain cooling rate, and those skilled in the art can make reasonable choices based on the composition of the glass product.

As shown in FIG. 2, based on the above-mentioned thermoforming method for a glass product, the present disclosure further provides a thermoforming mold 2 for a glass product. The thermoforming mold 2 uses the thermoforming method described in any of the above embodiments to mold a glass product.

Specifically, the thermoforming mold 2 comprises a female mold 202 and a male mold 204. The female mold 202 and the male mold 204 are matched with each other to mold a glass product.

In order to improve the molding quality of the glass product, the present disclosure proposes that the female mold 202 comprises a central body module 202a and a female mold frame 202b surrounding the central body module 202a. The central body module 202a and the female mold frame 202b together with the male mold 204 form a cavity for molding the glass product. The central body module 202a and the female mold frame 202b are independent of each other and can move relative to each other. The central body module 202a and the female mold frame 202b respectively have relative movement strokes for being clamped with and split from the male mold 204. In the clamping process, the central body module 202a and the female mold frame 202b can be respectively matched with the male mold 204 in sequence, i.e., the central body module 202a and the male mold 204 are matched firstly to apply a pressing force to the central plane portion of the glass sheet 6. The pressing force presses and forms the central plane portion of the glass sheet 6, and the clamping state of the central body module 202a and the male mold 204 is continuously maintained, and then the female mold frame 202b and the male mold 204 are matched to apply a pressing force to the peripheral portion of the glass sheet 6. The pressing force presses and forms the peripheral portion of the glass sheet 6.

As described above, during the thermoforming process of the glass product, the central body module 202a can be used firstly to apply a pressure to the central plane portion of the glass sheet 6. At this moment, the central plane portion of the glass sheet 6 is firstly pressurized and molded. At this moment, the clamped state of the central body module 202a and the male mold 204 is maintained, then the female mold frame 202b applies a pressure to the peripheral portion of the glass sheet 6. At this moment, the peripheral portion of the glass sheet 6 is pressurized and molded. Since the central plane portion is always pressed by the central body module 202a, even if the female mold frame 202b applies a pressure to the peripheral portion of the glass sheet 6, warping or size deviation of the central plane portion will not be caused, thereby improving the quality of the molded glass product and enhancing the manufacturing yield of the glass product.

The "relative movement strokes" mentioned herein comprise the following two cases. In one case, one of the female mold 202 and the male mold 204 is fixedly arranged and the other is movably arranged. During the thermoforming process, the female mold 202 and the male mold 204 move relatively to generate the relative movement strokes. In the other case, both the female mold 202 and the male mold 204 are movably arranged. During the thermoforming process, both the female mold 202 and the male mold 204 move towards the side close to each other to generate the relative movement strokes.

In this embodiment, alternatively, the female mold 202 is movably arranged and the male mold 204 is fixedly arranged. The female mold 202 moves towards the side close to the male mold 204 so as to be clamped with the male mold 204. On the contrary, the female mold 202 moves towards the side away from the male mold 204 so as to be split from the male mold 204. Compared with the solution that both the female mold 202 and the male mold 204 are movably arranged, this solution simplifies the structure of the thermoforming mold 2, and reduces the volume of the thermoforming mold 2.

With continued reference to FIG. 2, the female mold frame 202b is provided with an accommodating cavity in which the central body module 202a is arranged, so that the female mold frame 202b surrounds the central body module 202a.

To be specific, the central body module 202a is a T-shaped structure, which comprises a horizontal portion 202aa and a vertical portion 202ab connected to each other. The accommodating cavity 202bb comprises a large end and a small end arranged in order from top to bottom and communicated with each other, the horizontal portion 202aa is limitedly matched with an inside wall of the large end, and the vertical portion 202ab is limitedly matched with an inside wall of the small end, To be specific, the female mold frame 202b comprises a first end 301 and a second end 302 arranged sequentially along the mold clamping direction Y, the first end 301 includes a first inner wall 3011 enclosing a first cavity 3011a, the second end 302 includes a second inner wall 3021 enclosing a second cavity 3021a, an inner diameter D1 of the second cavity 3021a is smaller than an inner diameter D2 of the first cavity 3011a, and the first cavity 3011a is connected with the second cavity 3021a to form an accommodating cavity 202bb, and the central body 202a is received in the accommodating cavity 202bb, the horizontal portion 202aa is limitedly matched with the first inner wall 3011, and the vertical portion 202ab is limitedly matched with the second inner wall 3021, and through the limited match between the central body module 202a and the female mold frame 202b, the movement stability of the central body module 202a during clamping can be improved, and the molding quality can be enhanced.

Further, alternatively, the horizontal portion 202aa does not exceed an upper end plane of the large end during the relative movement stroke that the central body module 202a is split from the male mold 204, that is, a depth H1 of the first cavity 3011a along the mold clamping direction Y is greater than a thickness H2 of the horizontal portion 202aa along the mold clamping direction Y, the central body module 202a and the male mold 204 are always moving in the accommodating cavity when splitting, so that the central body module 202a is always limitedly matched with the female mold frame 202b no matter during the clamping stroke or the splitting stroke, so that the clamping stroke of the central body module 202a is more accurate and the molding size deviation is further reduced.

In the embodiment as shown in FIG. 2, the central body module 202a comprises a first pressing plane 202ac, and the first pressing plane 202ac covers the entire upper surface of the central plane portion, that is, an area of the first pressing plane 202ac is equal to an area of the upper surface of the central plane portion, and the central plane portion is entirely pressed by the central body module 202a, which ensures the flatness and the molding size of the central plane portion, and enhances the molding quality.

The thermoforming mold 2 further comprises a limiting block 206, and the limiting block 206 may be relatively fixed with the male mold 204. In a direction perpendicular to a clamping direction (X direction in FIG. 2), the female mold frame 202b may be limitedly matched with the limiting block 206. The limiting block 206 spaced apart from the glass sheet 6 with a cavity 2061 penetrating through a mold clamping direction Y, and the limiting block 206 limitedly matched with the female mold frame 202b to limit the female mold frame 202b from deviation. The limiting block 206 comprises an inside wall 2062, the second end 302 is limitedly matched with an inside wall 2062 of the cavity 2061, the second end 302 is located between the limiting block 206 and the glass sheet 6, the limiting block 206 spaced apart from the glass sheet 6 in a direction perpendicular to the clamping direction X. The limiting block 206 increases the stationary property when the female mold frame 202b presses the peripheral portion of the glass sheet 6, and avoids molding defects caused by the inclination of the female mold frame 202b.

In the present disclosure, the thermoforming mold 2 further comprises a driving portion (not shown in the figure), and the central body module 202a and the female mold frame 202b are respectively connected with the driving portion in one-to-one correspondence. The driving portion is a force applying member, and under the drive of the driving portion, the central body module 202a and the female mold frame 202b can move relative to the male mold 204, for example, clamping and splitting. The configuration of the driving portion enhances the automation degree of the thermoforming mold 2, saves manpower, and reduces the manual operation difficulty.

In some embodiments, the driving portion may comprise, but is not limited to an elastic device, a drive cylinder, a hydraulic cylinder, a motor and a thread screw mechanism, or the like.

Figure 3:
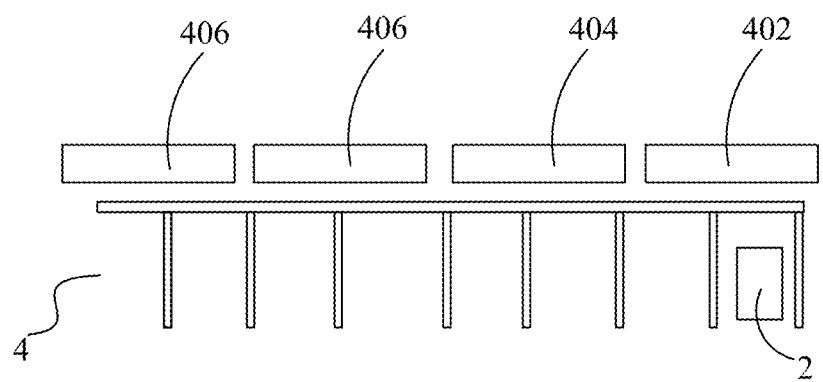
FIG. 3 is a schematic diagram of a partial structure of a thermoforming device provided by an embodiment of the present disclosure.

As shown in FIG. 3, based on the above-mentioned thermoforming mold 2, the present disclosure further provides a thermoforming device 4 which comprises a heating station 402, a pressurizing station 404, cooling stations 406 and the thermoforming mold 2 in any one of the above embodiments. The thermoforming mold 2 carries the glass sheet 6 to sequentially pass through the heating station 402, the pressurizing station 404, and the cooling stations 406 to achieve heating, pressurizing and molding, and cooling of the glass sheet 6.

The thermoforming device 4 realizes step-by-step molding of the glass sheet 6 by using the thermoforming mold 2, so that the molding quality of previous molding is not affected by subsequent molding, thus improving the molding quality of the glass product, and enhancing the manufacturing yield of the glass product.

The pressurizing station 404 comprises a first driving portion and a second driving portion (not shown in the figures). The first driving portion is in drive connection with the central body module 202a, and the second driving portion is in drive connection with the female mold frame 202b. Under the action of a driving force of the first driving portion, the central body module 202a generates a first stroke matched with the male mold 204 to apply a pressing force to the central plane portion of the glass sheet 6. Under the action of a driving force of the second driving portion, the female mold frame 202b generates a second stroke matched with the male mold 204 to apply a pressing force to the peripheral portion of the glass sheet 6, and a terminal position of the second stroke is set to be lower than a terminal position of the second stroke so that the peripheral portion is bent and molded relative to the central plane portion.

It is easy to understand that, on one hand, the first driving portion may drive the central body module 202a to be clamped with the male mold 204. On the other hand, the first driving portion may also drive the central body module 202a to be split from the male mold 204, that is, the first driving portion may provide two opposite acting forces for the central body module 202a. Similarly, the second driving portion may also provide two opposite acting forces for the female mold frame 202b to drive the female mold frame 202b to be clamped with or split from the male mold 204.

The first driving portion and the second driving portion may be separately arranged to independently control the central body module 202a and the female mold frame 202b. The control parameters comprise pressing force, acting time, stroke, and the like.

The acting force applied by the first driving portion to the central body module 202a and the acting force applied by the second driving portion to the female mold frame 202b may or may not coincide. The first driving portion and the second driving portion may be, but are not limited to springs, cylinders, hydraulic cylinders, motors, nut screw mechanisms, or the like.

The thermoforming device 4 may further comprise a plurality of heating stations 402 and a plurality of cooling stations 406. The heating stations 402 are arranged in sequence. The thermoforming mold 2 and the glass sheet 6 are gradually heated in the heating stations 402. The cooling stations 406 are arranged in sequence. The thermoforming mold 2 and the glass sheet 6 are gradually cooled in the cooling stations 406.

It should be noted that the cooling method of the cooling station 406 can adopt a slow manner to reduce the molding defects of the glass product and improve the molding quality.

Those described above are merely preferred embodiments of the disclosure, but are not intended to limit the disclosure. To those skilled in the art, the disclosure may have various changes and modifications. Any change, equivalent substitution, and improvement made within the spirit and principle of the disclosure shall fall within the protection scope of the disclosure.

What is claimed is:

1. A thermoforming mold for a glass product, comprising:
   a male mold;
   a female mold matched with the male mold;
   a glass sheet sandwiched between the male mold and the female mold;
   wherein, the female mold comprises a central body and a female mold frame surrounding the central body and matched therewith, the central body and the female mold frame are clamped with the male mold respectively, the central body and the male mold are clamped to press a central plane portion of the glass sheet, and the female mold frame and the male mold are clamped to press a peripheral portion of the glass sheet;
   a limiting block spaced apart from the glass sheet with a cavity penetrating through a mold clamping direction, an end of the female mold frame close to the male mold is accommodated in the cavity and located between the limiting block and the glass sheet, and the limiting block limitedly matched with the female mold frame to limit the female mold frame from deviation.

2. The thermoforming mold according to claim 1, wherein the central body is a T-shaped structure comprising a horizontal portion and a vertical portion connected to each other; and
   the female mold frame comprises a first end and a second end arranged sequentially along the mold clamping direction, the first end includes a first inner wall enclosing a first cavity, the second end includes a second inner wall enclosing a second cavity, an inner diameter of the second cavity is smaller than that of the first cavity, and the first cavity is connected with the second cavity to form an accommodating cavity, and the central body is received in the accommodating cavity, the horizontal portion is limitedly matched with the first inner wall, and the vertical portion is limitedly matched with the second inner wall.

3. The thermoforming mold according to claim 2, wherein a depth of the first cavity along the mold clamping direction is greater than a thickness of the horizontal portion along the mold clamping direction.

4. The thermoforming mold according to claim 2, wherein the second end is limitedly matched with an inside wall of the cavity, the second end is located between the limiting block and the glass sheet, the limiting block spaced apart from the glass sheet in a direction perpendicular to the clamping direction.

5. The thermoforming mold according to claim 1, wherein the central body comprises a first pressing plane, and an entire upper surface of the central plane portion is covered by the first pressing plane.

6. A thermoforming device for a glass product, comprising:
   a heating station;
   a pressurizing station;
   a cooling station; and
   the thermoforming mold according to claim 1,
   wherein, the thermoforming mold carries the glass sheet to sequentially pass through the heating station, the pressurizing station and the cooling station,
   the pressurizing station comprises a first driving portion and a second driving portion, the first driving portion is connected with the central body, and the second driving portion is connected with the female mold frame, and under an action of a driving force of the first driving portion, the central body matched with the male mold, under an action of a driving force of the second driving portion, the female mold frame matched with the male mold.

* * * * *